Jan. 3, 1950
C. A. MAXWELL
2,493,006
TUBE EXPANDER
Original Filed May 15, 1941
2 Sheets-Sheet 1
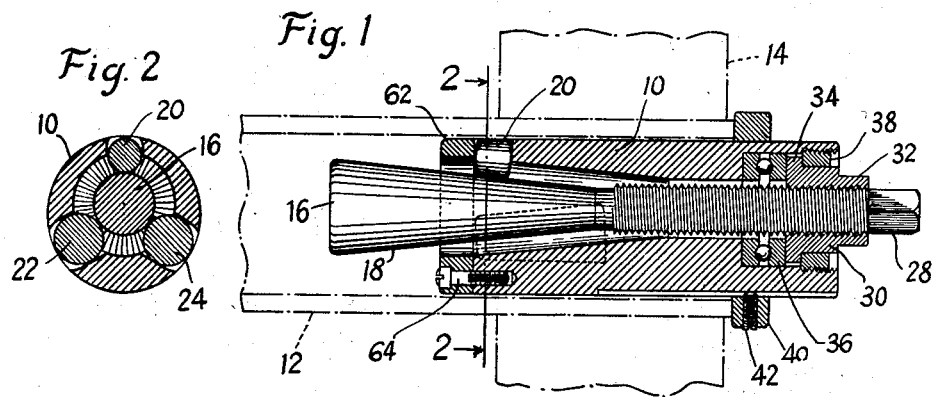
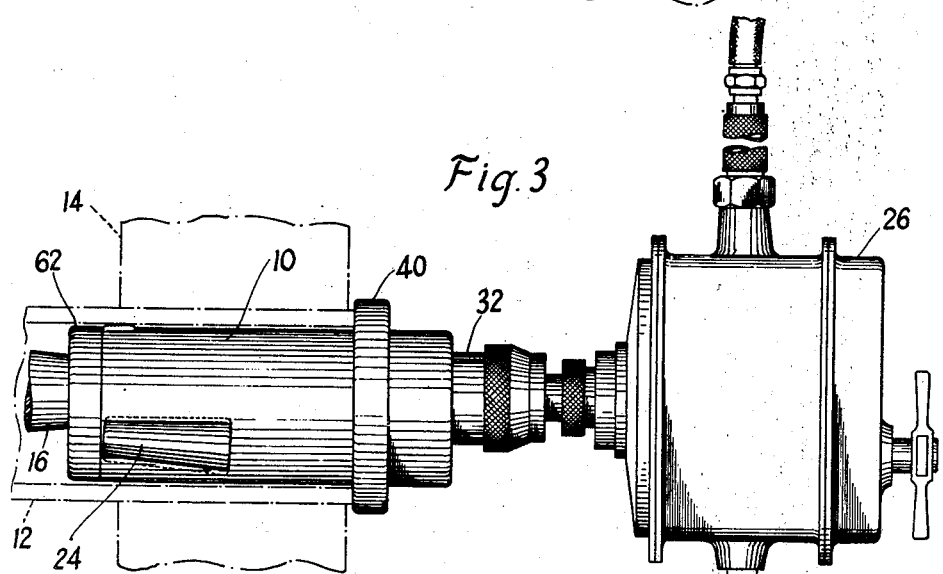
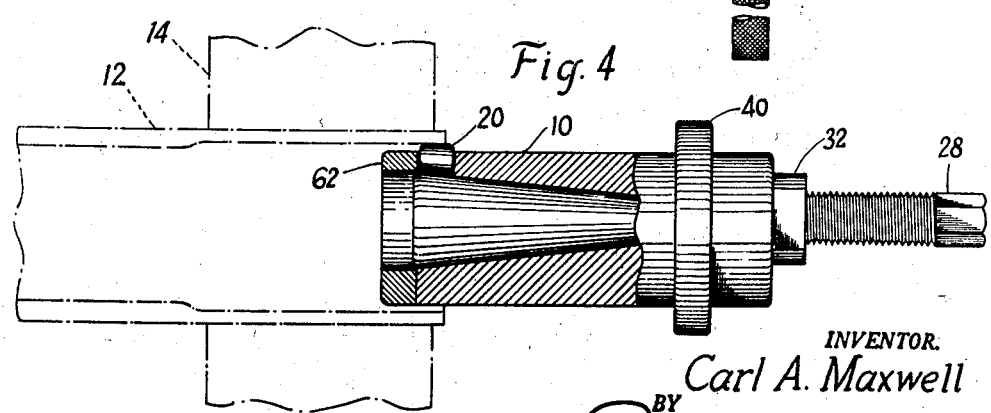
INVENTOR.
Carl A. Maxwell
BY
ATTORNEY Jan. 3, 1950     C. A. MAXWELL     2,493,006
TUBE EXPANDER Original Filed May 15, 1941     2 Sheets-Sheet 2

INVENTOR.
Carl A. Maxwell
BY
ATTORNEY

Patented Jan. 3, 1950

2,493,006

UNITED STATES PATENT OFFICE 2,493,006

TUBE EXPANDER

Carl A. Maxwell, Akron, Ohio, assignor to The Babcock & Wilcox Company, Newark, N. J., a corporation of New Jersey Original application May 15, 1941, Serial No. 393,505, now Patent No. 2,375,235, dated May 8, 1945. Divided and this application January 21, 1944, Serial No. 519,141

3 Claims. (Cl. 80—12)

The subject matter of this invention is the expanding of tubular members and, in a more specific sense, the expanding of metallic tubes against the walls of tube seats in which the tubes are fitted.

In the manufacture of fluid heat exchange apparatus such as steam generators, metallic tubes are fixed in headers, drums, or tube sheets by first positioning the tubes within closely fitting openings and then expanding the tubes tightly against the walls of those openings, and, with the advent of increasing pressures (an increase from 200 pounds per square inch to 2,500 pounds per square inch within a period of thirty years) and the use of furnaces operating at higher and higher temperatures an increasing number of problems have been encountered in such expanding operations. For example, with pressures increasing toward and beyond 2,000 pounds per square inch, the walls of headers and drums have correspondingly increased in thickness, and the same is true of the walls of the tubes.

Steels of improved quality and increased strength have also come into use and, when tubes are to be expanded into tube seats in a five inch wall of a drum of such improved steel, excessive resistance to the expanding operation has been encountered and greatly increased expanding forces have been necessary.

The expanders of the prior art have operated to expand the tube over the entire length of the tube seat, and as the tube seats have increased in length it has been necessary, with such prior art expanders to take excessively long periods of time to expand even a single tube within a tube seat. There are instances where it has taken a plurality of expander operators more than an hour to expand a single tube, under such conditions, and furthermore, this expanding, in such instances has involved large expanding forces and increased power.

Furthermore, as tube seats have increased in length and as tube wall thicknesses have increased, there has been excessive tube metal extrusion consequent upon the expanding operations. Such excessive extrusion has been particularly damaging in the expanding of tubes in steam generators involving a bank of tubes directly connecting and fixed to the same drums or headers. For example, let us consider the expanding of the tubes of a water tube steam boiler in an upper drum and the lower drum at the opposite ends of a large number of tubes which are to be subjected to a pressure of 1,000 pounds per square inch and to furnace gas temperatures ranging from 1,000 degrees F. to 3,000 degrees F. Necessarily, the tubes to stand such pressures must be of increased thickness and the manner of securement of the tubes to the drums must be such as to enable the connections to withstand not only high pressure but also the stresses set up by the variations in gas temperatures to which the tubes and the connections are subjected. Let us assume that the upper and lower headers are set in position and that the tubes are fitted in the drum tube seats by sliding them therein. The next step in the procedure is to expand the tubes to form pressure tight connections between the tubes and drums. The prior practice has been to proceed with the expanding operation from an end of a tube toward its midportion. Now, if this practice is followed and a pressure tight connection is made by such an expanding operation some of the tube metal will be caused to flow toward the other drum, this action resulting in an increase of the length of the tube. Now, when the attempt is made to use this prior art procedure to expand the other end of the same tube in the other drum, there cannot be the same relatively free movement of the tube to take care of the metal flow. However, the position of the drum may be modified to take care of such action. After this is done, however, the positions of the two drums are fixed. Thereafter, when the same procedure is attempted in the expanding of the successive tubes into the drums, a drum cannot be moved to take care of such metal flow and tube lengthening because the securement of the first tube has set the drum spacing, and consequently the remaining tube metal will be put under objectionable stresses. These may even be so great as to result in bending of the tubes.

Attempts have been made to eliminate these objectionable results of prior procedures by counter-boring the drum tube seats. This has the effect of decreasing the length of the tube seats and correspondingly decreasing the metal flows resulting from the tube expanding operation. However, this practice of counter-boring tube seats is objectionable because it reduces the strength of the drums in two ways. First of all, by the removal of metal in the immediate vicinity of the tube, and secondly, by a consequent decrease in ligament strength.

Among the objects of this invention is the elimination of such difficulties as those above mentioned, the reduction of power and time required to expand tubes within tube seats, and the formation of improved tube seat connections.

The present invention eliminates many of the above indicated difficulties by a procedure which involves, as its initial step; the expanding of that portion of a tube remote from the end of the tube and against that part of the tube seat metal which is adjacent to the wall of the drum or tube sheet remote from the end of the tube. This initial expanding step is accomplished in such a way that an optimum of tube metal flow is attained with a minimum of power consumption, and in a greatly decreased period of time. This is accomplished by having the roller expander element which does the preponderance of the expanding, of a small length relative to the length of the tube seats, other rollers of the expander acting mainly to guide the expander apparatus and to stabilize it within the tube. After this initial expanding operation, the active expander element is moved to a new and successive circular zone location toward the end of the tube from the first location and the expanding is continued. In this way, the flow of metal caused by the expanding operation is toward the end of the tube, and consequently there can be no tendency to put the tubes of a bank of tubes under excessive compressive stresses.

In general, when tubes are expanded in a tube sheet or into the walls of drums or headers, and are subjected to high fluid pressures, the tube and wall connections must be such as to resist great forces tending to move a tube longitudinally with reference to the tube seat and to disrupt the connections. Additionally, there are forces exerted longitudinally of the tubes and through them to the tube seats, resulting from strains induced by temperature changes. There are also torsional forces which may tend to disrupt the tube seat connection. These may result from various internal conditions such as temperature changes, or they may result from loading. These torsional stresses may be considered as exerted tangentially with reference to a tube so that they have a tendency to rotate the tube in the tube seat and thereby destroy the fluid tight connection.

The length of a tube seat, measured axially of a tube, is a major factor in determining the frictional resistance between a tube wall and a tube seat wall, and this resistance in a completed joint should nullify forces tending to longitudinally displace the tube with reference to the tube seat. The longer the tube seat, the greater the resistance, provided, of course, that the tube is expanded throughout the entire length of the tube seat. Additionally, it has been proposed that this pull-out resistance of a tube in a tube seat be increased by the milling of grooves in the seat, the tube metal being displaced into these grooves by the expanding operation. With this practice, some of the tube metal would be subjected to shearing stresses in resisting the forces which during the operation of the apparatus, tend to pull the tube out of the tube seat.

The torsional resistance to forces tending to pull a tube out of a tube seat is also a function of the circumferential area of contact between the tube and the seat and this type of resistance is greated in a long tube seat than it is in a short one. Long tube seats therefore have the advantage of a greater resistance to pull-out forces as well as the advantage of increased torsional resistance.

The suggested practice of grooving tube seats would not have the desired effect of increasing the resistance to torsional forces tending to disrupt the tube seat. Furthermore, the machining the grooves of the tube seats would involve considerable expense.

High pressure drums are expensive because of the thickness of the metal utilized in their fabrication, and because of the weight of the drums, and therefore, it is important, that, in the use of such drums, there be effective utilization of the maximum permissible ligament strength, to reduce drum wall thickness and thereby reduce drum cost.

In distinction to some of the prior art practices, such as those involving the utilization of counter-bored tube seats for high pressure boilers, the tube seats of the present invention, are carried completely throughout the drum metal and are more effective in the providing of adequate ligaments. In some grooved tube seats the length of the tube seat is but a fraction of the total drum thickness and the seat is provided with a counter-bored opening extending initially from the tube seat and of a length sufficient to permit axial movement of the tube. Attempts to roller expand tubes into such tube seats have resulted in flow of metal into the portions of the tubes externally of the tube seats. It has been thought that such metal flow would not be objectionable on account of the limited length of the tube seat, but the pull-out strength of such tube seat connections and their resistance to forces tending to develop torsional displacements have been proven to be inadequate. This may have been due to deficiencies in the effect of prior art expanders of their method of employment. The use of prior art roller expanders in attempts to form expanded tube seat connections with grooved tube seats has not been satisfactory because the action of the expanders has caused such flow of metal that the expanded metal in a previously filled groove would be subject to excessive shearing action when other grooves are filled. A first groove might be partially filled with tube metal, but the action of the expander in an attempt to fill a successive groove has resulted in a shearing of the metal within the first filled groove. Such shearing action is eliminated by the use of the expander of this invention, and by its use longer tube seats with a plurality of grooves may be successfully employed. The use of the illustrative expander in such tube sheets results in a filling of all of the grooves with flowed tube metal which remains integral with the metal of the expanded tube.

The present invention also provides such tube seats that there may be maximum ligament strengths. The illustrative tube seats can also be machined at much lower cost, but these advantages, along with the advantages of increased pull-out and torsional resistance can be utilized only when the method of expanding is such that the tube metal flow resulting from the expanding will not induce excessive stresses in the tube and drum assembly. Such objectionable stresses are avoided by a practice in which the flow of metal during the expanding operation is toward the end of the tube rather than toward the middle of the tube.

This application is a division of my co-pending application Serial No. 393,505, filed May 15, 1941, now Patent No. 2,375,235, granted May 8, 1945, and the expander claimed herein is adapted for expanding tubes of great wall thickness such as those required for installations operating at high pressures where the tube wall thickness may be in excess of $\frac{1}{4}''$, and the length of the tube seats greater than three inches. Tube seats of such characteristics result in expanding operations which involve forces of high magnitude to cause the necessary metal flow.

In accomplishing the above indicated results the present invention includes within its purview an expander apparatus in which stabilizing rolls are so arranged with respect to the remainder of the expander apparatus that they automatically cause the active portions of the expander rolls to continuously move through the tube and toward the end of the tube.

In general, the present invention may be considered apparatus for expanding a heavy wall tube into a tube seat, and more particularly, into tube seats which are of lengths greater than the diameter of the tubes to be inserted therein, by working of the metal from the tube seat end remote from the adjacent tube end, toward the end of the tube, the illustrated apparatus being such that it is self-advancing.

The various features of novelty which characterize my invention, in compliance with the Federal statutes relating thereto, are pointed out with particularity in the claims annexed to and forming a part of this specification, but, for a better understanding of the invention and the advantages possessed by it, reference should be had to the accompanying drawings and descriptive matter in which I have illustrated or described preferred embodiments of my invention. Other objects of the invention will also appear as the following description proceeds.

In the drawings:

Fig. 1 is a transverse section through a tube and tube seat assembly, and the illustrative roller expander for developing a pressure tight joint between the tube and the wall in which the tube seat is formed;

Fig. 2 is a transverse section of the Fig. 1 expander, on the line 2—2 of Fig. 1;

Fig. 3 is an assembly view showing mechanism for operating the illustrative roller expander which is shown in elevation;

Fig. 4 is a combined longitudinal section and side elevation illustrating the last step in the expanding method in which the Fig. 1 expander may be employed;

Fig. 7 is a partial elevation of the Fig. 5 expander cage particularly indicating the off-set angular relationship of the axis of the cage and the axis of one of the stabilizing rolls. The position from which this elevation is taken may be considered as indicated by the arrow 15a; and Fig. 8 is a partial longitudinal section of the Fig. 5 expander cage taken on the section line 8—8 of Fig. 6.

Figure 5:
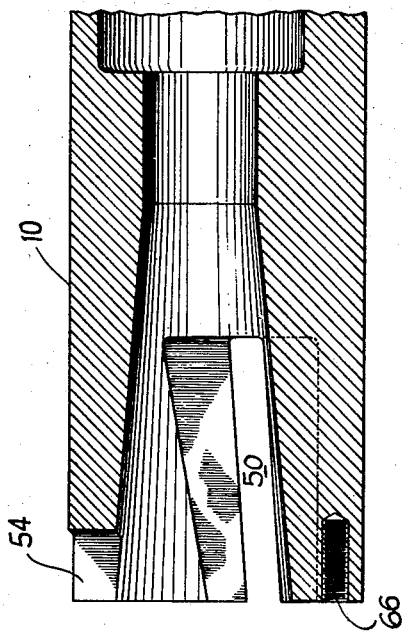
Fig. 5 is a partial longitudinal section of the roller cage of the Fig. 1 expander, illustrating the relationships of the roller retention sockets. This view is taken on the section line 5—5 of Fig. 6.

The expander illustrated in Figs. 1-4, inclusive, and 5-8, inclusive, of the drawings may be considered as a retractive roller expander in which the expander rolls and the mandrel are eccentric to the roller cage and to the tube to be expanded. The expander barrel or cage 10 is a steel body formed somewhat as a cylinder with such an external diameter that it will be readily received within a tube to be expanded into a tube seat in the wall 14. The cage is formed with an eccentric bore to receive a mandrel 16.

The mandrel is formed with a tapered section 18, the surface of which causes the expanding roll 20 and the positioning and feeding rolls 22 and 24 to move outwardly of the expander cage when the mandrel is moved to the right (Fig. 1) with reference to the cage and the tube seat wall 14.

The advancement of the mandrel to tube expanding position, after the expander is inserted within the tube as indicated in Fig. 1, is caused by rotation to the mandrel. In practice, the mandrel is rotated by a motor 26 which is readily detachably connected to the squared end 28 of the mandrel. The motor may be hand supported and the looseness of the detachable connection between the motor and the coupling end of the mandrel may be such that the orbital movement of the mandrel is not particularly troublesome to the operator. During this rotation and during the initial stages of the tube expanding operation, longitudinal advance of the mandrel is effected by reason of the inter-engagement of the screw threaded part of the mandrel with an internally screw threaded sleeve 30 formed with a coupling extension 32, the latter being initially held stationary by a wrench or spanner.

The sleeve 30 is formed with a radial flange 34, one face of which contacts the thrust bearing 36 disposed at the bottom of a recess in the end of the cage 10, the sleeve 30 being confined between the bearing 36 and the locking ring 38 screw threaded into the cage 10, as shown.

The distance to which the Fig. 1 expander extends into the tube 12 is determined by the adjustment of a stop sleeve 40 along the cage 10. This sleeve is locked in a predetermined position by the set screw 42.

When the sleeve 30 is thus held stationary the rotation of the mandrel causes it to move to the right so as to force the expanding roll 20 and the stabilizing rolls 22 and 24 against the internal surface of the tube 12.

Figures 7, 8:
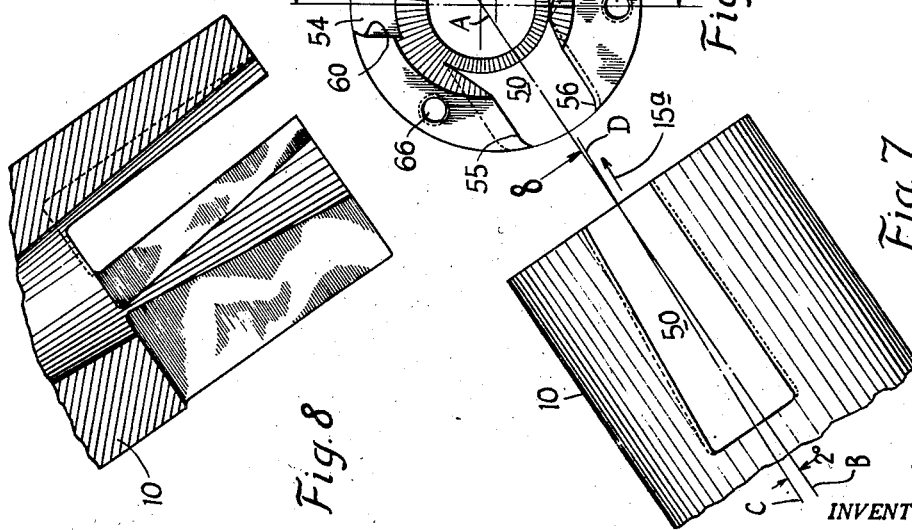

When the frictional resistance resulting from the contact of the tube and roller surfaces reaches a certain degree, the rolls 20, 22 and 24 begin to rotate on their own axes as planet gears and, consequently, the cage 10, operating somewhat in the nature of an orbit gear, is also rotated, but at a different rate. As this operation continues the expanding roller 20, guided and stabilized within the tube by the rolls 22 and 24 exerts increasing pressure radially outwardly on the inner wall of the tube 12 and causes the tube metal to flow axially of the tube, and toward the right hand end of the tube (Fig. 1). At the same time, due to the differential taper of the rollers and the mandrel, and due to the 2 degree angular relationship (lead angle) of the mandrel center line to the center lines of the positioning and feeding rollers 22 and 24 (see Fig. 7) the rollers begin to advance the entire expander toward the right of the position in which it is indicated in Fig. 1. These relationships are such that the tendency of their combined action to advance the expander overcomes the tendency of the expanding roll to mount the tapered portion of the mandrel.

After the bite of the expanding roller 20 into the tube metal reaches the desired degree, the spanner is removed from the coupling 32, and the above indicated relationship of forces thereafter produces an automatic advance of the expander out of the tube.

Figure 6:
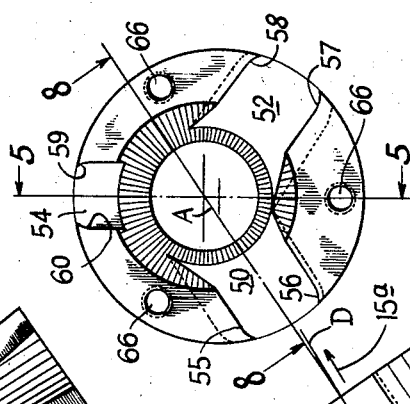
Fig. 6 is an end elevation of the expander cage illustrated in Fig. 5.

The angularity of the center lines of the positioning and feeding rolls 22 and 24 with respect to the center line AB of the mandrel (Figs. 6 and 7 of the drawings) illustrates one of the factors producing the automatic advance, or self-feeding action of the expander out of the tube. The line CD may be considered as representing the center line of the roller 22 mounted in the retention socket 50 of the cage 10. As indicated, the lines CD and AB are disposed at an angle of 2 degrees.

The retention socket 50 for the roller 22, as well as the sockets 52 and 54 for the rollers 24 and 20, respectively, may be described as formed with walls which are re-entrant at positions such as 55–60, inclusive, adjacent the periphery of the cage 10. This construction prevents the rolls from falling out of their operative positions around the mandrel 16.

The sockets are otherwise shaped within the annular portion of the cage 10 so as to permit the rolls to move freely radially with respect to the cage.

After the rolls 20, 22 and 24 are inserted in the sockets 50, 52 and 54 they are retained therein by a closure ring 62 corresponding in external contour to the left hand end (Figs. 1 and 2) of the cage. This ring is held in its operative position by a stud screw 64 fitting within an internally screw threaded bore 66 in the end wall of the cage.

A comparison of the extent of the surface of the expander roller 20 in contact with the metal of the tube 12 during the actual expanding operation to the sum of surfaces of the positioning and feeding rollers 22 and 24 in similar contact will indicate the ratio of roller surface which is actually expanding the tube to the roller surface involved in expander stabilizing and advancing actions. All of the actual expanding is done by the roller 20, and thus there is a very great reduction of momentary flow of tube metal, in comparison with other expanders which use a plurality of rolls each of which accomplishes the same degree of expanding.

In the present instance, the larger rolls, 22 and 24, serve to stabilize the expanding action and cause the automatic advance of the expander out of the tube.

In the use of the expander described herein, the tube 12 may be considered as fixed, and its end is disposed snugly within a tube seat opening in the wall or tube sheet 14. With the rollers retracted within the circumference of the expander as indicated in Fig. 2, and the mandrel 16 disposed somewhat as indicated in Fig. 1, the entire expander is manually inserted within the tube with the large end of the mandrel foremost.

The circumferential stop 40 secured to the cage or barrel 10 may contact the surface of the tube sheet 14 or the end of the tube as indicated in the drawings, so as to determine the extent to which the expander is disposed within the tube, and to determine the position at which the tube expanding and drawing is begun.

After the expander is disposed within the tube as above indicated, an attendant grasps the handles of a fluid motor 26 and holds the motor against the right hand end of the mandrel with the coupling socket of the motor receiving the polygonal coupling end 28 of the mandrel. While the motor is held coupled to the mandrel in this manner, the operation of the motor is initiated to rotate the mandrel in such a direction that it is translated toward the right with respect to the cage 10. This translatory movement is caused by the manual holding of the polygonal end of the nut 30 stationary by the operator.

The cage 10 remains stationary during the above action, and it does not begin to move to the right until the nut 30 is released. Thereafter, the lead angle at which the rollers, particularly the rollers 22 and 24, are disposed with reference to the axis of the mandrel, the relation of the tapers of the rollers to the taper of the mandrel, and the rotation of the mandrel by the motor 26 causes the rollers to move the cage to the right as the tube metal is expanded and drawn. During this action, the mandrel of course has an orbital movement as well as rotation on its own axis, but the radius of the orbit is so small that the operator experiences no difficulty in holding the motor in its operative relation to the expander. Fig. 4 indicates the relationship of the parts as the tube expanding operation is substantially completed.

What is claimed is:

1. In an eccentric retractive roll expander, a barrel or cage adapted to fit within a tube to be expanded, the barrel having a mandrel receiving bore which is eccentric with reference to the barrel axis and the tube axis, a mandrel rotatably mounted within the barrel and having an active tapered portion, a tapered expander roll in rolling engagement with the mandrel and having an active surface of a length which is but a fraction of the length of the tapered portion of the mandrel, said expander roll being disposed in an opening entirely at one end of the barrel, said opening extending through the thinner part of the barrel, a plurality of tapered stabilizing rollers set at a lead angle in rolling engagement with the mandrel and disposed at distributed positions around the barrel and in barrel openings circumferentially spaced from said expander roll opening, said last mentioned rollers being of a length and diameter much greater than the expander roll, means fixed with reference to the barrel for limiting the extent of the insertion of the expander within a tube, and adjustment means for causing the mandrel to be moved longitudinally with respect to the barrel.

2. In an eccentric retractive roll expander for expanding tubes into tube seats formed in a wall of a pressure vessel, a roller cage adapted to easily fit within a tube when its rollers are radially retracted, the cage having a mandrel bore formed eccentrically therein, a mandrel extending through the bore and having an active tapered portion, a tapered expander roll in rolling engagement with the mandrel and having an active surface of a length which is but a fraction of the length of the tapered portion of the mandrel, said expander roll being disposed in a cage opening toward one end of the cage and contacting only the larger part of the tapered mandrel portion, said expander roll opening extending through the thinner part of the cage, a plurality of tapered stabilizing rollers in rolling engagement with the mandrel and disposed at distributed positions around the cage and in cage openings circumferentially spaced from said expander roll opening, said last mentioned rollers being of a length and diameter much greater than similar dimensions of the first mentioned roll and set at a lead angle with their axes in planes external to any plane determined by the longitudinal axis of the cage and the longitudinal axis of the mandrel, means adapted to be fixed with reference to the cage for limiting the extent of the insertion of the expander within a tube, and an internally threaded part secured to the stop end of the cage and adapted to be initially held against rotation as the mandrel is rotated, the mandrel having an externally threaded extension engaged with said internally threaded part to effect relative longitudinal movement of the mandrel and the cage to radially outwardly displace all of said rollers after the cage has been inserted within the tube to its fullest extent.

3. In a retractive roller expander, a roller cage having roller positioning openings therein, a stop fixed relative to the cage and operative to engage the end of a tube to be expanded and to limit the movement of the cage into the tube, a mandrel eccentrically and rotatably mounted within the cage, the mandrel having a tapered section disposed at the tube side of said stop with its smaller end toward the stop, tube engaging tapered rollers in rolling engagement with the mandrel and positioned within the cage openings so that they are disposed circumferentially about the mandrel, one of said rollers disposed in the radially thinner part of the cage being of a diameter and a length much smaller than the corresponding dimensions of the remaining rollers, and an internally threaded part secured to the stop end of the cage and adapted to be initially held against rotation as the mandrel is rotated, the mandrel having an externally threaded extension engaged with said internally threaded part to effect relative longitudinal movement between the mandrel and the cage to produce radial displacement of the rollers to expand the tube after the expander has been positioned within the tube, at least one of said remaining rollers being disposed at a lead angle relative to the mandrel axis so that the subsequent rotation of the mandrel causes the progressive expansion of the tube and the retractive movement of the expander toward the adjacent tube end.

CARL A. MAXWELL.

REFERENCES CITED

The following references are of record in the file of this patent:

UNITED STATES PATENTS

| Number | Name | Date |
|---|---|---|
| 485,442 | Wiedeke | Nov. 1, 1892 |
| 2,045,787 | Maupin | June 30, 1936 |
| 2,219,784 | Maupin | Oct. 29, 1940 |
| 2,375,235 | Maxwell | May 8, 1945 |

FOREIGN PATENTS

| Number | Country | Date |
|---|---|---|
| 566,685 | Germany | Dec. 22, 1932 |